March 7, 1967   R. E. THOMAS ETAL   3,307,926
BEARING CONSTRUCTION
Filed Oct. 2, 1964
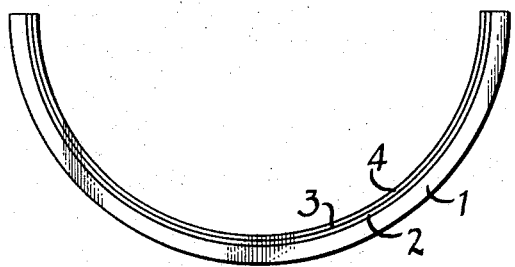
INVENTORS
ROBERT E. THOMAS
BY DAVID C. MITCHELL
WILSON, SETTLE & CRAIG
ATTORNEYS United States Patent Office 3,307,926
Patented Mar. 7, 1967

3,307,926
BEARING CONSTRUCTION
Robert E. Thomas, Detroit, and David C. Mitchell, Bloomfield Hills, Mich., assignors to Detroit Aluminum & Brass Corporation, Detroit, Mich., a corporation of Michigan
Filed Oct. 2, 1964, Ser. No. 401,061
3 Claims. (Cl. 29—196.4)

The present invention relates to a bearing construction of the type having a ferrous backing member with a bonded intermediate layer consisting of a good heat conducting non-ferrous metal of medium modulus of elasticity and a coating of tin containing bearing metal bonded to the surface of the intermediate layer, and more particularly to such a bearing construction in which an improved barrier layer is provided between the intermediate layer and the coating of bearing metal into the intermediate layer.

Bearings of the general type presently under consideration have been in widespread use for a number of years. The intermediate layer is generally a copper-lead alloy. The coating of bearing material is most commonly lead alloyed with tin and copper. The tin is provided to increase the corrosion, erosion and fatigue resistance of the lead. Lead is very susceptible to corrosion in the hot lubrication oils to which the bearing is subjected during use.

One problem encountered with such bearing constructions is that the tin in the coating of bearing material gradually diffuses into the intermediate layer resulting in a reduction in the corrosion, erosion and fatigue resistance of the material.

It has been proposed in the past, for instance in United States Patent No. 2,459,172, to provide a diffusion barrier layer between the heat conducting layer and the coating of bearing metal in order to retard this diffusion. Nickel, brass, cobalt and iron have been proposed for the barrier layer. The provision of a barrier layer has been found to be effective. The present invention provides an improved barrier layer.

An object of the invention is to provide a bearing construction having a barrier layer between the intermediate layer and the coating of bearing metal which results in effective retardation of diffusion of tin from the bearing metal into the intermediate layer.

Another object of the invention is to provide an alloy composition for electroplating onto the intermediate layer of a bearing, the alloy composition having consistant deposit characteristics over a wide range of plating solution compositions and current densities to thus reduce the difficulty of process control with a resultant reduced cost attendant thereon.

Another object of the invention is to provide such a barrier composition which will provide an excellent bond when directly electroplated onto the intermediate layer without requiring a flash layer of other metal upon the intermediate layer.

A still further object of this invention is to provide a barrier layer which is effective in thicknesses below the commonly used values.

Other objects of this invention will appear in the following description and appended claims, reference being had to the accompanying drawing forming a part of this specification wherein like reference characters designate corresponding parts in the several views.

In the drawing:
The figure is a side elevational view of a bearing construction according to one embodiment of the present invention.

Before explaining the present invention in detail, it is to be understood that the invention is not limited in its application to the details of construction and arrangement of parts illustrated in the accompanying drawing, since the invention is capable of other embodiments and of being practised or carried out in various ways. Also, it is to be understood that the phraseology or terminology employed herein is for the purpose of description and not of limitation.

Referring to the figure, it will be noted that the bearing construction comprises a generally semi-cylindrical ferrous backing member 1. The backing member 1 is preferably fabricated from a low carbon steel, a low carbon steel being defined as a steel having less than 0.3% carbon. The thickness of the backing member 1 will vary in accordance with the requirements of the particular bearing.

A relatively thick intermediate layer 2 consisting of a good heat conducting non-ferrous metal of medium modulus of elasticity is bonded to the interior concave surface of the backing member 1. The intermediate layer 2 may be copper, silver or their alloys. In general use, it is a composition comprising 5% to 40% by weight of lead, up to 15% by weight of tin, with the balance being copper. The thickness of the layer 2 is dictated by the application. Generally, the thickness will be in the range of from 0.005 to 0.030 inch.

Bonded to the intermediate layer 2 is a diffusion barrier layer 3. In accordance with the present invention, the barrier layer 3 comprises a composition of approximately 67% tin and 33% nickel. This layer is applied to the intermediate layer 2 by electro-deposition. While the thickness of the barrier layer may be as much as 0.0001 inch or more, it also affords a high degree of diffusion control at thicknesses as low as 0.00002 inch.

The following is an example of a bath makeup for electro-deposition of the barrier layer:

| | Ounces per gallon |
|---|---|
| Stannous chloride | 6.5 |
| Nickel chloride | 40.0 |
| Ammonium bifluoride | 7.5 |

Ammonium hydroxide may be added to the bath to adjust to the pH required. The pH generally should be from 2 to 3.

The electro-deposition may be accomplished in temperature ranges of from 150° F. to 170° F. with a current density of 20 to 50 amperes per square foot.

The barrier layer may have a composition ranging from 60% to 75% by weight of tin and from 25% to 40% by weight of nickel. A composition of about 67% by weight of tin and 33% by weight of nickel is preferred. In order to achieve this, the electroplating bath should contain from 3.5 to 5.0 ounces of tin per gallon and from 8.0 to 11.0 ounces of nickel per gallon.

A coating 4 of bearing metal is bounded to the barrier layer 3. The coating 4 is generally a lead-tin alloy to which copper may be added. This alloy normally comprises from 5% to 20% by weight of tin, up to 5% by weight of copper, with the balance being lead. Although the thickness of the coating is dictated by the application, it generally falls in the range of 0.003 to 0.0020 inch.

Tests were run comparing bearings constructed in accordance with the present invention with bearings constructed in accordance with three different prior art techniques. Each of the bearings were the same, except that different barrier layer compositions or no barrier layer compositions at all were used between the lead-tin bearing coating and the copper lead alloy bearing lining. The bearings were connecting rod bearings for internal combustion engines. The bearings were installed in engines which were then operated under controlled conditions for approximately 137 hours. The tests are representative of arduous normal usage. The intermediate lining of each bearing had a thickness of 0.010 inch and a composition of approximately 25% lead, 1% tin, with the remainder being copper. The bearing metal coating of each bearing had a thickness of 0.001 inch and a composition of approximately 12% tin, 2% copper, with the remainder being lead.

The following are the average results of a number of tests made on the four different types of bearing:

| Barrier layer material (thickness 0.00008 inch): | Percent of tin lost from bearing coating |
|---|---|
| Tin-nickel alloy (67% tin, 33% nickel) | 32 |
| Nickel | 39 |
| Brass (75% copper, 25% zinc) | 43 |
| No barrier | 62 |

Another test was run on the four bearing constructions as above. These bearings were immersed in hot lubricating oil at a temperature of approximately 300° F. for a period of 200 hours. The results were as follows:

| Barrier layer material (thickness 0.00008 inch): | Percent of tin lost from bearing coating |
|---|---|
| Tin-nickel (67% tin, 33% nickel) | 21 |
| Nickel | 24 |
| Brass (75% copper, 25% zinc) | 30 |
| No barrier | 52 |

Still another test was run on two of the types of bearings as above except that the barrier thickness was reduced to 0.00002 inch. These bearings were also immersed in hot lubricating oil at a temperature of 300° F. for a period of 200 hours. The results were as follows:

| Barrier layer material (thickness 0.00002 inch) | Percent tin lost from bearing coating |
|---|---|
| Tin-nickel (67% tin, 33% nickel) | 28 |
| Nickel | 35 |

Having thus described our invention, we claim:

1. In a composite bearing construction comprising a steel backing layer, an intermediate layer of a good heat conducting medium modulus of elasticity metal on said backing layer, a surface layer of a tin containing bearing alloy metal, the improvement comprising a barrier layer consisting essentially of from 60% to 75% by weight of tin and from 25% to 40% by weight of nickel between said intermediate layer and said surface layer, all of said layers being uniformly bonded to each other over their entire surfaces.

2. In a composite bearing construction comprising a steel backing layer, an intermediate layer consisting of a good heat conducting non-ferrous metal of medium modulus of elasticity bonded on said backing layer, a surface layer of a tin-containing alloy metal, the improvement comprising a barrier layer consisting essentially of about 67% by weight of tin and about 33% by weight of nickel between said intermediate layer and said surface layer, all of said layers being uniformly bonded to each other over their entire surfaces.

3. In a composite bearing construction comprising a steel backing layer, an intermediate layer of a good heat conducting medium modulus of elasticity metal on said backing layer, a surface layer of a tin-containing bearing alloy metal, the improvement comprising a barrier layer in the range of about 0.00002 to 0.00005 inch between said intermediate layer and said surface layer, said barrier layer consisting essentially of from 60% to 75% by weight of tin and from 25% to 40% by weight of nickel, all of said layers being uniformly bonded to each other over their entire surfaces.

References Cited by the Examiner

UNITED STATES PATENTS

| 2,304,709 | 12/1942 | Rubin. | |
| 2,459,172 | 1/1949 | Luetkemeyer | 29—196.4 X |
| 2,658,866 | 11/1953 | Parkinson | 204—43 |
| 2,765,520 | 10/1956 | Donley | 204—43 X |
| 2,914,449 | 11/1959 | Mayer | 204—43 X |
| 2,926,124 | 2/1960 | Taylor | 204—43 |

OTHER REFERENCES

"Constitution of Binary Alloys," by Dr. Max Hansen, published McGraw Hill Book Company, 1958, pages 1042–1045.

HYLAND BIZOT, *Primary Examiner.*